(12) United States Patent
Yang

(10) Patent No.: US 9,355,314 B2
(45) Date of Patent: May 31, 2016

(54) HEAD-MOUNTED DISPLAY APPARATUS AND LOGIN METHOD THEREOF

(71) Applicant: Quanta Computer Inc., Tao Yaun Shien (TW)

(72) Inventor: Wen-Chu Yang, New Taipei (TW)

(73) Assignee: QUANTA COMPUTER INC., Tao Yuan Shien (TW)

(\*) Notice: Subject to any disclaimer, the term of this patent is extended or adjusted under 35 U.S.C. 154(b) by 46 days.

(21) Appl. No.: 14/164,944

(22) Filed: Jan. 27, 2014

(65) Prior Publication Data
US 2015/0139509 A1    May 21, 2015

(30) Foreign Application Priority Data

Nov. 18, 2013  (TW) .............................. 102141931 A

(51) Int. Cl.
| | | |
|---|---|---|
| *G06K 9/00* | (2006.01) | |
| *G02B 27/01* | (2006.01) | |
| *G06K 9/20* | (2006.01) | |

(52) U.S. Cl.
CPC .......... *G06K 9/00604* (2013.01); *G02B 27/017* (2013.01); *G06K 9/209* (2013.01); *G06K 9/2018* (2013.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 5,341,181 | A  * | 8/1994 | Godard ......................... | 351/210 |
| 7,986,816 | B1 * | 7/2011 | Hoanca .............. | G06K 9/00597 382/115 |
| 8,856,541 | B1 * | 10/2014 | Chaudhury ............. | G06F 21/32 382/115 |
| 8,878,749 | B1 * | 11/2014 | Wu ......................... | G01S 17/06 345/8 |
| 9,096,920 | B1 * | 8/2015 | Gomez et al. | |
| 9,171,198 | B1 * | 10/2015 | Raffle ................. | G06K 9/00281 |
| 2003/0091215 | A1* | 5/2003 | Lauper ............... | G06K 9/00597 382/117 |
| 2006/0115130 | A1* | 6/2006 | Kozlay .......................... | 382/117 |
| 2008/0089559 | A1* | 4/2008 | Koumura ...................... | 382/117 |
| 2013/0088685 | A1* | 4/2013 | Holland ........................ | 351/206 |
| 2013/0336547 | A1* | 12/2013 | Komogortsev ........ | A61B 5/117 382/117 |
| 2014/0341441 | A1* | 11/2014 | Slaby ...................... | G06F 21/32 382/117 |
| 2014/0354514 | A1* | 12/2014 | Aronsson ................ | G06F 3/013 345/7 |
| 2015/0085251 | A1* | 3/2015 | Larsen ............... | G06K 9/00604 351/206 |

\* cited by examiner

*Primary Examiner* — Siamak Harandi
*Assistant Examiner* — Narek Zohrabyan
(74) *Attorney, Agent, or Firm* — Rabin & Berdo, P.C.

(57) ABSTRACT

Head-mounted display apparatus and login method thereof are provided. The head-mounted display apparatus includes an image capturing device, a pico-projector, an application specific integrated circuit (ASIC), and an application processor. The image capturing device captures a first eye image and a plurality of second eye images corresponding to a locus image. The ASIC determines whether the first eye image passes an iris recognition test. The application processor controls a pico-projector to project the locus image when the first eye image passes an iris recognition test, and generates a pupil locus based on the plurality of second eye images. The application processor determines whether the pupil locus is compliant with the locus image, and allows a login request if the pupil locus is compliant with the locus image.

20 Claims, 12 Drawing Sheets

HEAD-MOUNTED DISPLAY APPARATUS AND LOGIN METHOD THEREOF

This application claims the benefit of Taiwan application Serial No. 102141931, filed Nov. 18, 2013, the subject matter of which is incorporated herein by reference.

BACKGROUND OF THE INVENTION

1. Field of the Invention

The invention relates in general to an electronic apparatus, and more particularly to a head-mounted display apparatus and login method thereof.

2. Description of the Related Art

As technology progresses, people receive more information from electronic devices, such as multimedia players, network communication devices, and computers, which are equipped with display devices such as CRTs or LCDs for displaying images. The number of pixels and size of the image displayed by the display devices are constrained by the size of the display devices and their performance. Hence, the conventional CRT or LCD displays cannot meet the requirement of compact, portability, and a size with high display quality. For resolving this problem, the head-mounted display (HMD) is provided in the market. The head-mounted display provides two small tubes or LCDs disposed in front of the left and right eyes of a person. For example, a head-mounted display achieves stereoscopic effects by using binocular parallax, which projects images outputted from the tubes or LCDs through beam splitters onto the eyes of the user.

The head-mounted display, in a login process, requires a user to input a password so as to identify the user. Since no input device such as a keyboard for entering a user's password is equipped in the head-mounted display, user identification may be based on a voice password. However, the accuracy of such user identification may be degraded due to the voice password affected by the situation such as the health condition or background noise. In addition, a voice password may be recorded by unauthorized persons, thus causing the failure of the correct identification for the authorized user only.

SUMMARY OF THE INVENTION

The invention is directed to a head-mounted display apparatus and login method thereof.

According to the invention, a login method for a head-mounted display apparatus is provided. The method includes the following. A first eye image is captured by an image capturing device. It is determined whether the first eye image passes an iris recognition test. A pico-projector is controlled to project a locus image if the first eye image passes an iris recognition test. A plurality of second eye images corresponding to the locus image are captured by the image capturing device. A pupil locus is generated based on the plurality of second eye images. It is determined whether the pupil locus is compliant with the locus image. A login request is allowed if the pupil locus is compliant with the locus image.

According to the invention, a head-mounted display apparatus is provided. The head-mounted display apparatus includes an image capturing device, a pico-projector, an application specific integrated circuit (ASIC), and an application processor. The image capturing device captures a first eye image and a plurality of second eye images corresponding to a locus image. The application specific integrated circuit determines whether the first eye image passes an iris recognition test. The application processor controls a pico-projector to project the locus image when the first eye image passes an iris recognition test, and generates a pupil locus based on the plurality of second eye images. The application processor determines whether the pupil locus is compliant with the locus image, and allows a login request if the pupil locus is compliant with the locus image.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
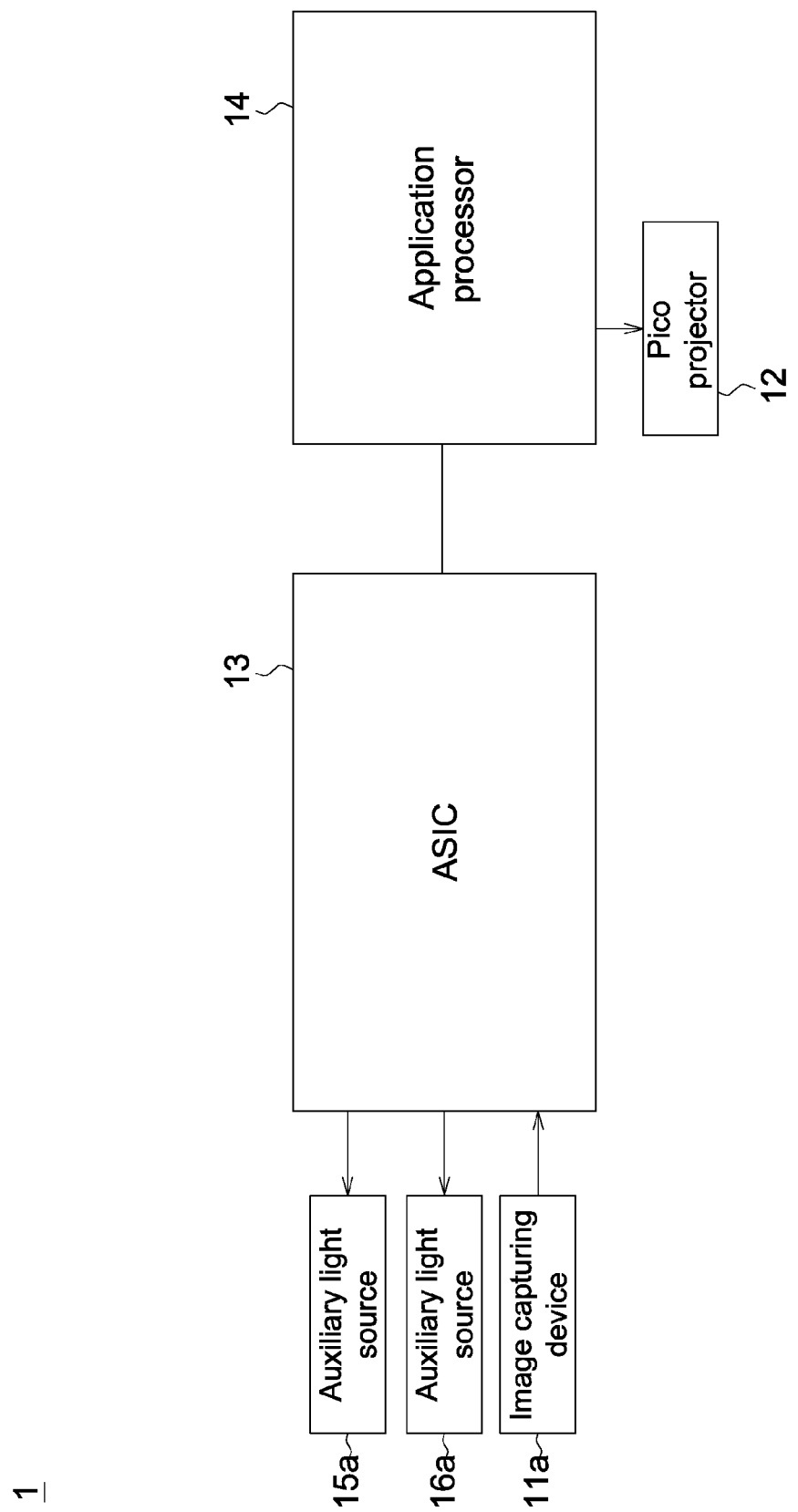
FIG. 1 shows a block diagram illustrating a head-mounted display apparatus according to a first embodiment.

Referring to FIG. 1, a block diagram illustrates a head-mounted display apparatus according to a first embodiment. A head-mounted display apparatus 1 includes an image capturing device 11a, a pico-projector 12, an application specific integrated circuit (ASIC) 13, an application processor 14, an auxiliary light source 15a, and an auxiliary light source 16a. The image capturing device 11a communicates with the ASIC 13 through a mobile industry processor interface (MIPI) or a parallel interface (I/F). The ASIC 13 turns on or off the auxiliary light sources 15a and 16a through a general purpose input output (GPIO) interface. The application processor 14 controls the pico-projector 12 through a display interface. The application processor 14 communicates with the ASIC 13 through a universal serial bus (USB). The auxiliary light source 15a belongs to a type different from that of the auxiliary light source 16a. For instance, the auxiliary light source 15a is a white light-emitting diode and the auxiliary light source 16a is an infrared light-emitting diode. Alternatively, the auxiliary light source 15a is an infrared light-emitting diode and the auxiliary light source 16a is a white light-emitting diode. The head-mounted display apparatus 1, when equipped with an infrared light-emitting diode and a white light-emitting diode, can lead to a reduced false rejection rate (FRR). The false rejection rate indicates a rate of recognition tests that are expected to pass, but fail unexpectedly.

Figure 2A:
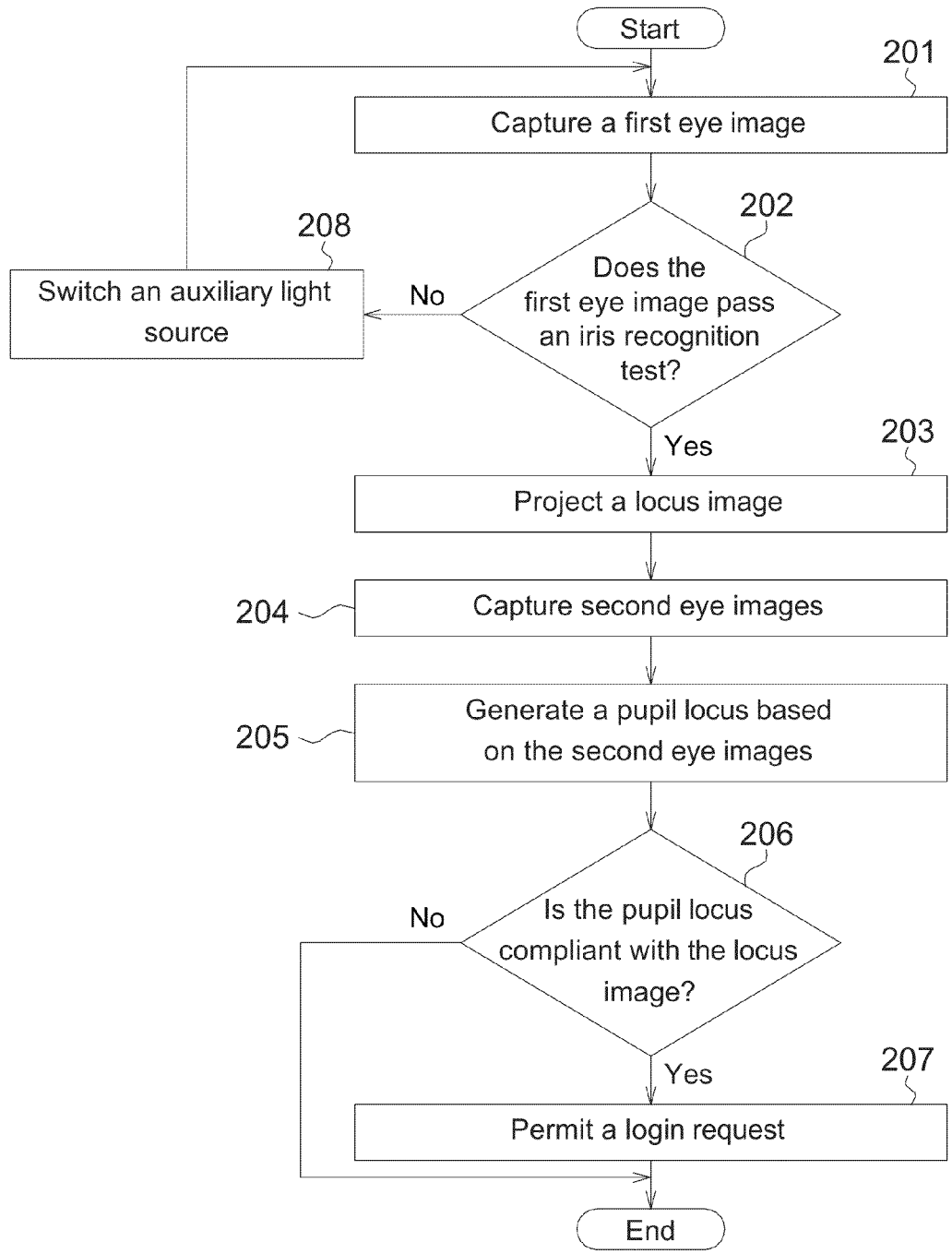
FIGS. 2A and 2B are respectively a flowchart illustrating a login method for a head-mounted display apparatus according to the first embodiment, and a flowchart illustrating a calibration mode.

Referring to FIGS. 1 and 2A, FIG. 2A shows a flowchart illustrating a login method for a head-mounted display apparatus according to the first embodiment. The login method for the head-mounted display apparatus 1 includes the following steps. First, in step 201, the image capturing device 11a captures a first eye image of a user. In step 202, the ASIC 13 determines whether the first eye image passes an iris recognition test. When the first eye image does not pass the iris recognition test, step 208 is then performed. As shown in step 208, the ASIC 13 switches between the auxiliary light sources. For example, the ASIC 13 turns off the auxiliary light source 15a, which has been turned on previously, and turns on the auxiliary light source 16a, which has been turned off previously. Conversely, the ASIC 13 turns off the auxiliary light source 16a, which has been turned on previously, and turns on the auxiliary light source 15a, which has been turned off previously. Steps 201 and 202 are then repeated. Since an iris has 240 feature points, the accuracy of user recognition can be at a high level.

When the first eye image passes the iris recognition test, the ASIC 13 outputs its recognition result to the application processor 14 and step 203 is then performed. As shown in step 203, the application processor 14 controls the pico-projector 12 to project a locus image. An eye-directed point of the user moves along the locus image, and then, as shown in step 204, the image capturing device 11a captures a plurality of second eye images corresponding to the locus image. After that, in step 205, the ASIC 13 generates a pupil locus based on the second eye images. The ASIC 13, for example, first detects the pupil size for each of the second eye images, and then computes a pupil center for each pupil size. The ASIC 13 computes the coordinates of the pupil center in each second eye image as pupil coordinates, and generates a pupil locus based on the pupil coordinates. In step 206, the application processor 14 then determines whether the pupil locus is compliant with the locus image. When the pupil locus is compliant with the locus image, step 207 is then performed. As shown in step 207, the application processor 14 allows a login request of the user.

It is noted that after the image capturing device 11a captures the first eye image or the second eye images, the ASIC 13, for example, can further perform image processing on the first eye image or the second eye images before performing the iris recognition test or generating the pupil locus. The image processing, for example, includes the following step. First, the ASIC 13 performs a perspective calibration on the first eye image so as to generate a front view image of an eye. Based on the front view image of the eye, the ASIC 13 can obtain the positions of the eye and iris, more effectively, and can calibrate the distortion caused by the projection. Afterwards, the ASIC 13 performs eye detection so as to avoid misjudgment that may caused by the image capturing device 11a capturing an undesired wink of the user. The ASIC 13 then reduces the noise of the front view image of the eye and the interference from the eyelash and the shadow. The ASIC 13 performs image enhancement, such as the enhancement of texture of iris in the images. In addition, the implementation is not limited to the above example, which is applied to the first eye image. For example, the above image processing can be applied to the second eye images.

Figure 3:
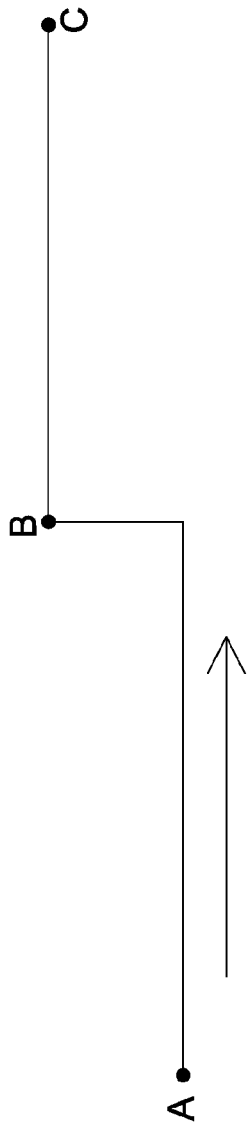
FIG. 3 shows an example of a locus image of a first type.
Figure 4:
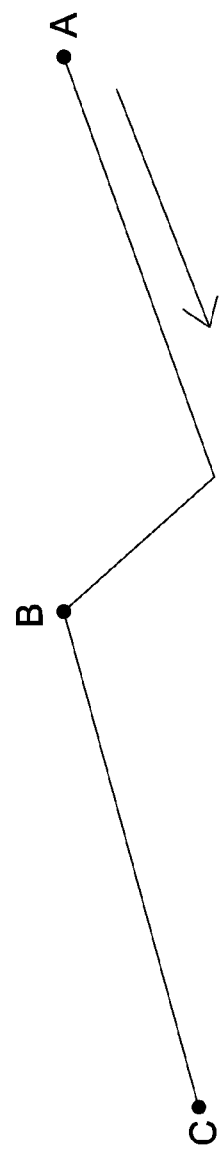
FIG. 4 shows an example of a locus image of a second type.
Figure 5:
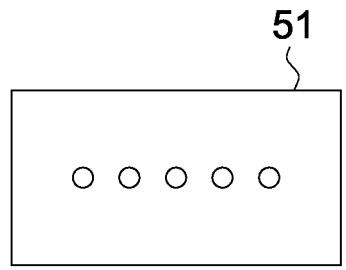
FIG. 5 shows an example of a locus image of a straight line.

Referring to FIGS. 1, 3, and 4, FIG. 3 shows an example of a locus image of a first type, and FIG. 4 shows an example of a locus image of a second type. The locus image includes a start point A, a gaze point B, and an end point C. The gaze point B lies between the start point A and the end point C. The locus image directs the user to make one's eye-directed point move from the start point A to the gaze point B, stay at the gaze point B for a preset time period, and then move towards the end point C. For example, the preset time period is about 0.5 second. The second eye images include a glare image corresponding to the gaze point B. When the eye-directed point stays at the gaze point B, the ASIC 13 determines whether the glare image passes the iris recognition test. When the glare image passes the iris recognition test, the locus image further directs the eye-directed point moving towards the end point C. Performing the iris recognition test again during the user moving his or her eye-directed point can effectively prevent others from being logged in with an eye image.

Figure 6:
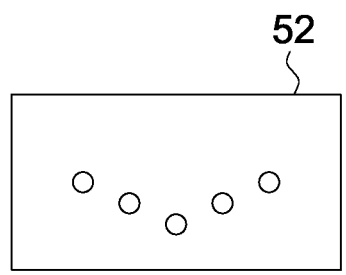
FIG. 6 illustrates an initial pupil locus on an upper portion of the eyes for an image capturing device.
Figure 7:
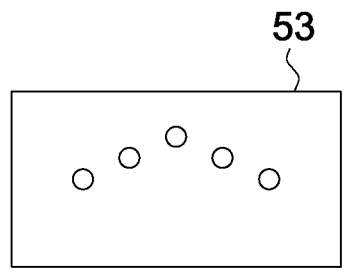
FIG. 7 illustrates an initial pupil locus on a lower portion of the eyes for the image capturing device.

Referring to FIGS. 1, 5, 6, and 7, FIG. 5 shows an example of a locus image of a straight line, FIG. 6 illustrates an example of an initial pupil locus on an upper portion of the eyes for the image capturing device, and FIG. 7 illustrates an example of an initial pupil locus on a lower portion of the eyes for the image capturing device. It is noted that the pupil locus generated from the second eye images captured by the image capturing device 11a is not a straight line although the pupil of the user moves along a straight line, since the eye ball of the user is a sphere and the image capturing angle of the image capturing device 11a makes an angle difference with the eye ball. When the image capturing device 11a is disposed above the eyes, the initial pupil locus 52 generated from the second eye images captured by the image capturing device 11a is non-linear, as exemplified in FIG. 6. The head-mounted display apparatus 1 can obtain calibration parameters by performing calibration in a calibration mode, and can calibrate the pupil locus according to the calibration parameters when performing the login method.

Figure 2B:
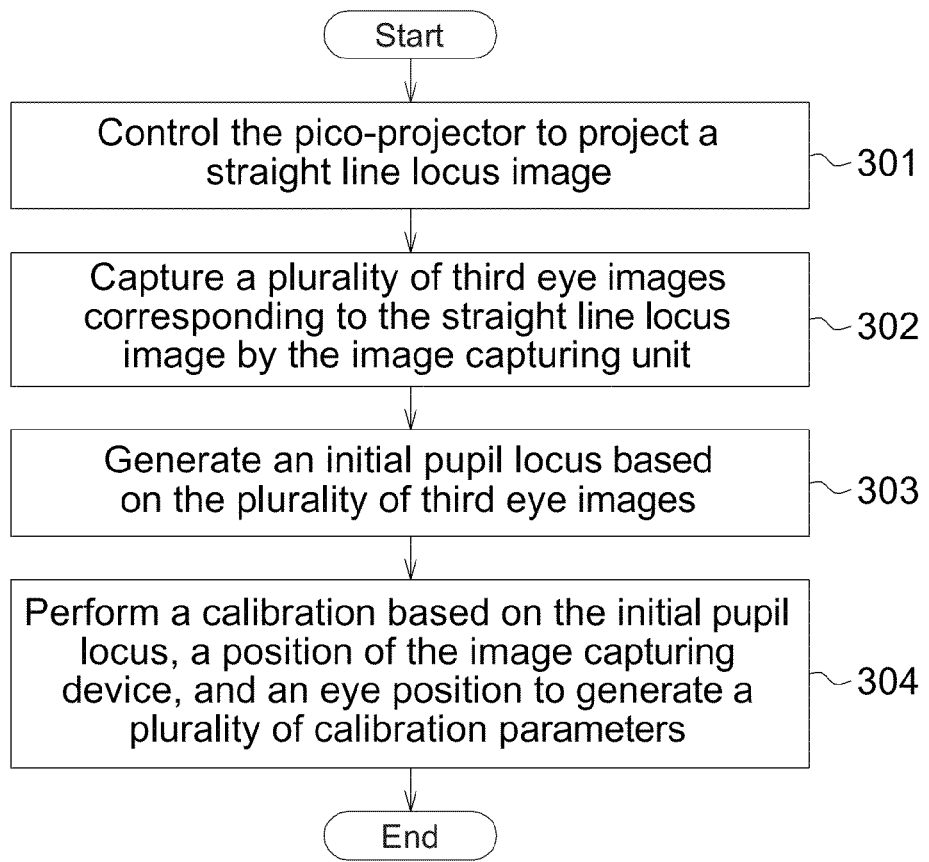

Further, please refer to FIG. 2B which is a flowchart illustrating a calibration mode. In step 301, the application processor 14 controls the pico-projector 12 to project a straight line locus image 51. In step 302, the image capturing device 11a captures a plurality of third eye images corresponding to the straight line locus image. In step 303, the ASIC 13 generates an initial pupil locus 52 based on the plurality of third eye images. In step 304, a calibration is performed based on the initial pupil locus 52, a position of the image capturing device 11a, an eye position, and a theoretical straight line locus image 51 to generate a plurality of calibration parameters. The calibration includes locus calibration with respect to horizontal and vertical directions. Similar to the above example in FIG. 6, when the image capturing device 11a is disposed below the eyes, an initial pupil locus 53 generated by the application processor 14 is non-linear, as shown in FIG. 7. In the calibration mode, the ASIC 13 generates the initial pupil locus 53 based on the third eye images, and performs a calibration based on the initial pupil locus 53, the position of the image capturing device 11a, the eye position, and the theoretical straight line locus image 51 to generate a plurality of calibration parameters. In addition, the calibration with respect to the vertical direction can be performed similarly to the above example. For the sake of brevity, such example will not be repeated.

Figure 8:
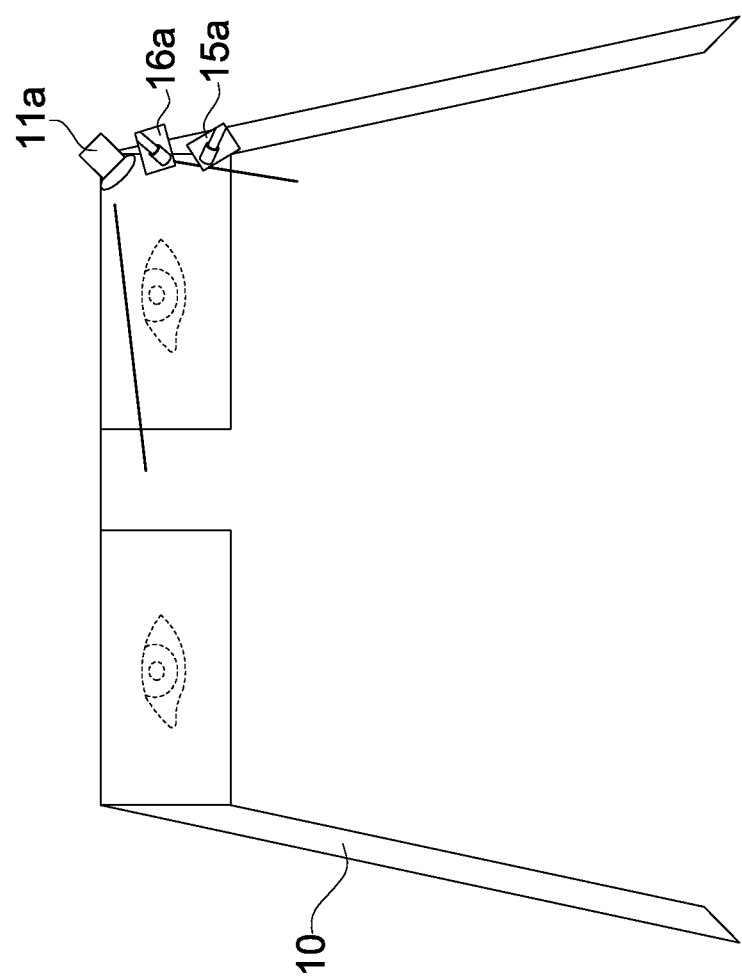
FIG. 8 shows a schematic diagram of the appearance of a first example of the head-mounted display apparatus according to the first embodiment.

Referring to FIG. 8, a schematic diagram illustrates the appearance of a first example of the head-mounted display apparatus according to the first embodiment. In FIG. 8, the auxiliary light source 15a is a white light-emitting diode and the auxiliary light source 16a is an infrared light-emitting diode. The image capturing device 11a and the auxiliary light source 16a are disposed in a right upper corner of a lens rim of the eyeglass frame 10, and the auxiliary light source 15a is disposed in a right lower corner of the lens rim of the eyeglass frame 10. The optical axis of the image capturing device 11a is parallel to the optical axis of the auxiliary light source 16a, and the optical axis of the auxiliary light source 16a makes an angle with the optical axis of the auxiliary light source 15a. When the optical axis of the image capturing device 11a is parallel to the optical axis of the auxiliary light source 16a, the light from the auxiliary light source 16a reflects off the retina, thus causing a bright pupil effect. The bright pupil effect can reduce the interference from the eyelash or shadow, and also facilitate the pupil detection under a low ambient brightness. In addition, the bright pupil effect facilitates detection of the user with blue or gray eyes.

Figure 9:
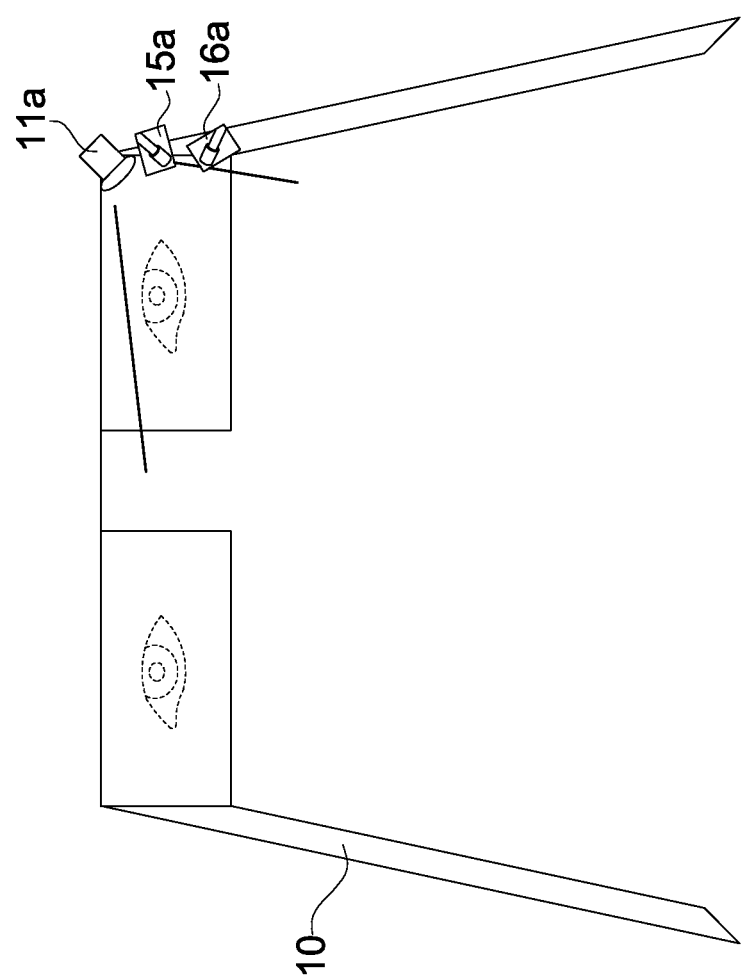
FIG. 9 shows a schematic diagram of the appearance of a second example of the head-mounted display apparatus according to the first embodiment.

Referring to FIG. 9, a schematic diagram shows the appearance of a second example of the head-mounted display apparatus according to the first embodiment. In FIG. 9, the auxiliary light source 15a is a white light-emitting diode and the auxiliary light source 16a is an infrared light-emitting diode. The image capturing device 11a and the auxiliary light source 15a are disposed in a right upper corner of a lens rim of the eyeglass frame 10, and the auxiliary light source 16a is disposed in a right lower corner of the lens rim of the eyeglass frame 10. The optical axis of the image capturing device 11a is parallel to the optical axis of the auxiliary light source 15a, and the optical axis of the auxiliary light source 15a makes an angle with the optical axis of the auxiliary light source 16a. When the optical axis of the image capturing device 11a makes an angle with the optical axis of the auxiliary light source 16a, the light reflected by the pupil cannot enter the image capturing device 11a so as to produce a dark pupil effect. The dark pupil effect facilitates pupil detection under high ambient brightness or with natural light. In addition, the dark pupil effect can benefit the detection of the user with dark eyes. In other embodiments, the head-mounted display apparatus can further include an additional auxiliary light source which is an infrared light-emitting diode and is parallel to the optical axis of the image capturing device 11a. In this case, the ASIC 13 can turn on the auxiliary light source 16a or the additional auxiliary source, selectively, depending on the ambient condition, so as to detect the user's pupil by the application of the bright pupil effect or the dark pupil effect.

Figure 10:
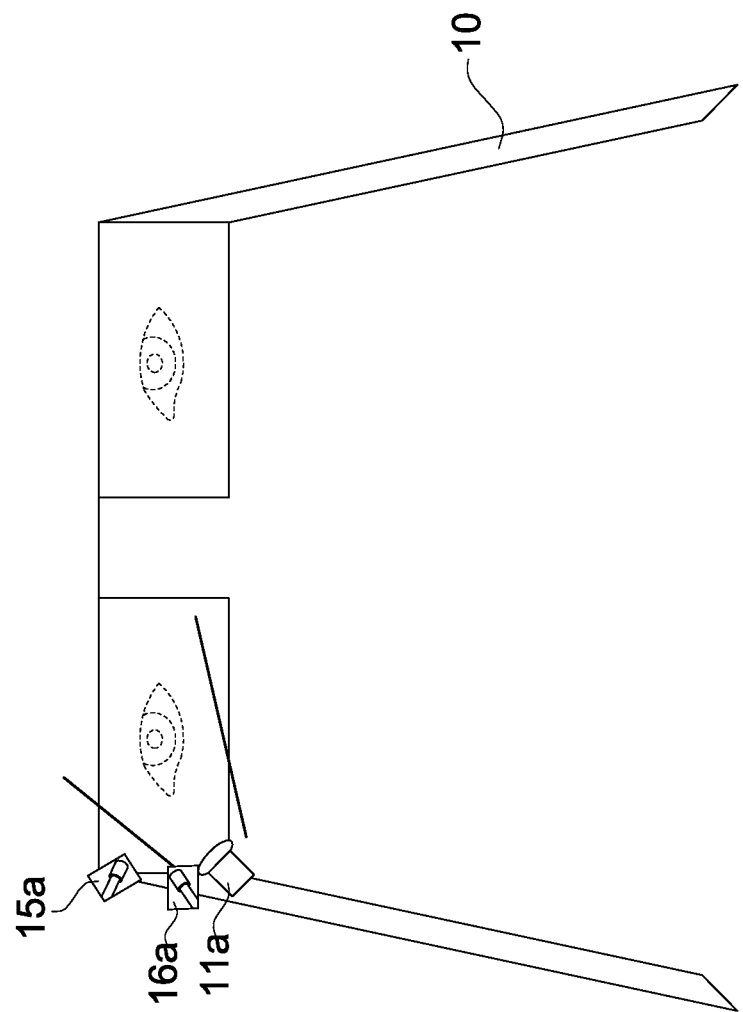
FIG. 10 shows a schematic diagram of the appearance of a third example of the head-mounted display apparatus according to the first embodiment.

Referring to FIG. 10, a schematic diagram shows the appearance of a third example of the head-mounted display apparatus according to the first embodiment. In FIG. 10, the auxiliary light source 15a is a white light-emitting diode and the auxiliary light source 16a is an infrared light-emitting diode. The image capturing device 11a and the auxiliary light source 16a are disposed in a left lower corner of a lens rim of the eyeglass frame 10, and the auxiliary light source 15a is disposed in a left upper corner of the lens rim of the eyeglass frame 10. The optical axis of the image capturing device 11a is parallel to the optical axis of the auxiliary light source 16a, and the optical axis of the auxiliary light source 16a makes an angle with the optical axis of the auxiliary light source 15a. When the optical axis of the image capturing device 11a is parallel to the optical axis of the auxiliary light source 16a, a bright pupil effect produces since the light from the auxiliary light source 16a reflected off by the retina. The bright pupil effect can reduce the interference from the eyelash or shadow, and also facilitate the pupil detection under a low ambient brightness. In addition, the bright pupil effect facilitates detection of the user with blue or gray eyes.

Figure 11:
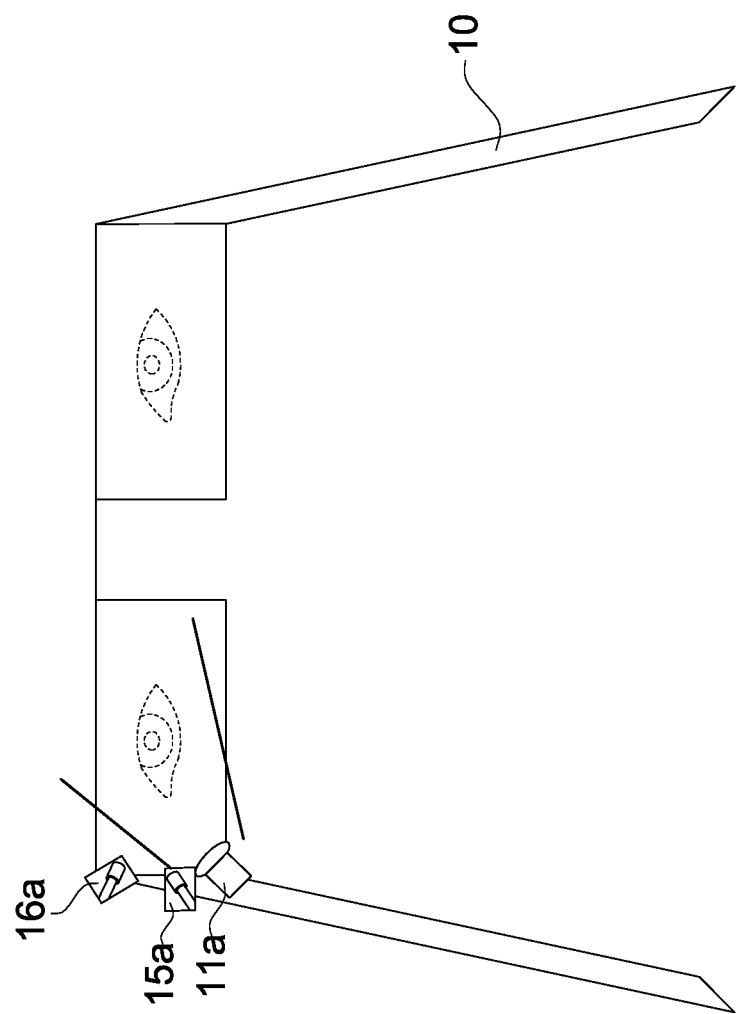
FIG. 11 shows a schematic diagram of the appearance of a fourth example of the head-mounted display apparatus according to the first embodiment.

Referring to FIG. 11, a schematic diagram shows the appearance of a fourth example of the head-mounted display apparatus according to the first embodiment. In FIG. 11, the auxiliary light source 15a is a white light-emitting diode and the auxiliary light source 16a is an infrared light-emitting diode. The image capturing device 11a and the auxiliary light source 15a are disposed in a left lower corner of a lens rim of the eyeglass frame 10, and the auxiliary light source 16a is disposed in a left upper corner of the lens rim of the eyeglass frame 10. The optical axis of the image capturing device 11a is parallel to the optical axis of the auxiliary light source 15a, and the optical axis of the auxiliary light source 15a makes an angle with the optical axis of the auxiliary light source 16a. When the optical axis of the image capturing device 11a makes an angle with the optical axis of the auxiliary light source 16a, the light reflected by the pupil cannot enter the image capturing device 11a so as to produce a dark pupil effect. The dark pupil effect can facilitate pupil detection under high ambient brightness or with natural light shining. In addition, the dark pupil effect can benefit the detection of the user with dark eyes.

Second Embodiment

Figure 12:
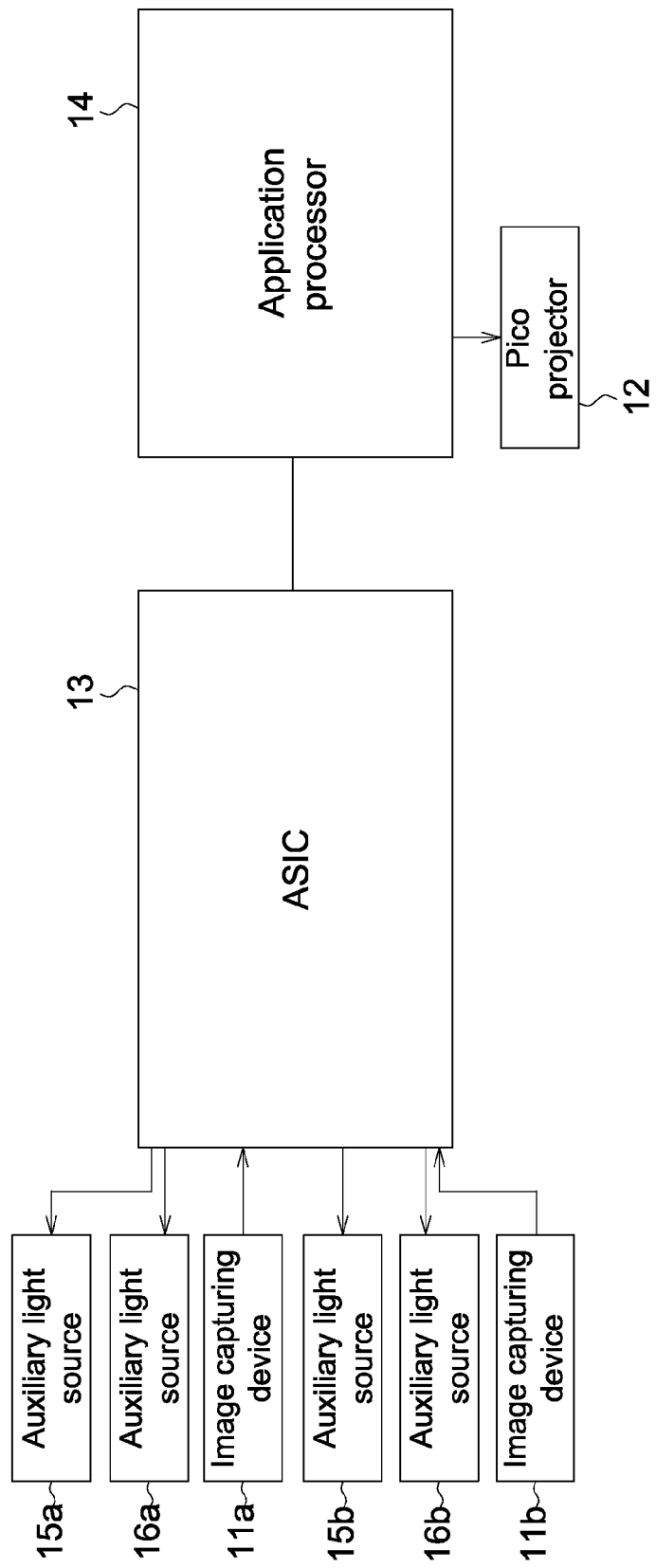
FIG. 12 shows a block diagram illustrating a head-mounted display apparatus according to a second embodiment.

Referring to FIG. 12, a block diagram illustrates a head-mounted display apparatus according to a second embodiment. A head-mounted display apparatus 3 further includes an image capturing device 11b, an auxiliary light source 15b, and an auxiliary light source 16b, in addition to the image capturing device 11a, the pico-projector 12, the application specific integrated circuit (ASIC) 13, the application processor 14, the auxiliary light source 15a, and the auxiliary light source 16a. The image capturing device 11b communicates with the ASIC 13 through a mobile industry processor interface (MIPI) or a parallel interface (I/F). The ASIC 13 turns on or off the auxiliary light sources 15b and 16b through a general purpose input output (GPIO) interface. The auxiliary light source 15b belongs to a type different from that of the auxiliary light source 16b. For instance, the auxiliary light source 15b is a white light-emitting diode and the auxiliary light source 16b is an infrared light-emitting diode. Alternatively, the auxiliary light source 15b is an infrared light-emitting diode and the auxiliary light source 16b is a white light-emitting diode. The head-mounted display apparatus 3, when equipped with the image capturing devices 11a and 11b, can lead to a reduced false acceptance rate (FAR). The false acceptance rate indicates a rate of recognition tests that are expected to fail, but pass unexpectedly.

Figure 13:
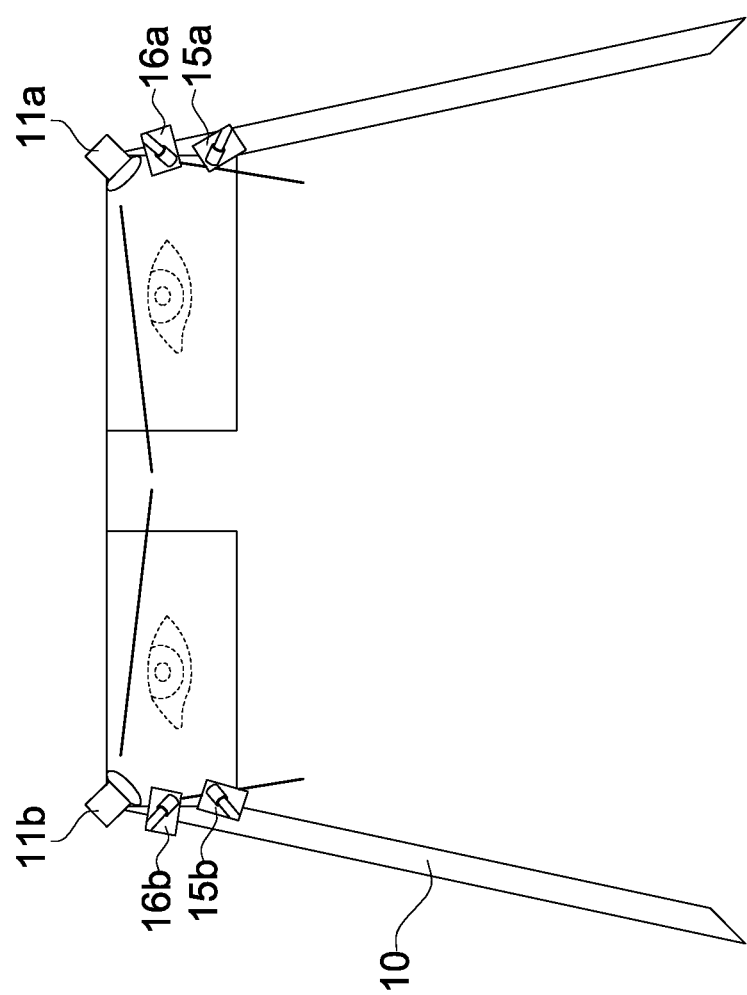
FIG. 13 shows a schematic diagram of the appearance of a first example of the head-mounted display apparatus according to the second embodiment.

Referring to FIGS. 8, 12, and 13, FIG. 13 shows a schematic diagram of the appearance of a first example of the head-mounted display apparatus according to the second embodiment. In FIG. 13, the auxiliary light sources 15a and 15b are white light-emitting diodes and the auxiliary light sources 16a and 16b are infrared light-emitting diodes. The embodiment shown in FIG. 13 differs from that in FIG. 8 in that the image capturing device 11b and the auxiliary light source 16b are disposed in a left upper corner of a lens rim of the eyeglass frame 10, and the auxiliary light source 15b is disposed in a left lower corner of the lens rim of the eyeglass frame 10. The optical axis of the image capturing device 11b is parallel to the optical axis of the auxiliary light source 16b, and the optical axis of the auxiliary light source 16b makes an angle with the optical axis of the auxiliary light source 15b.

Figure 14:
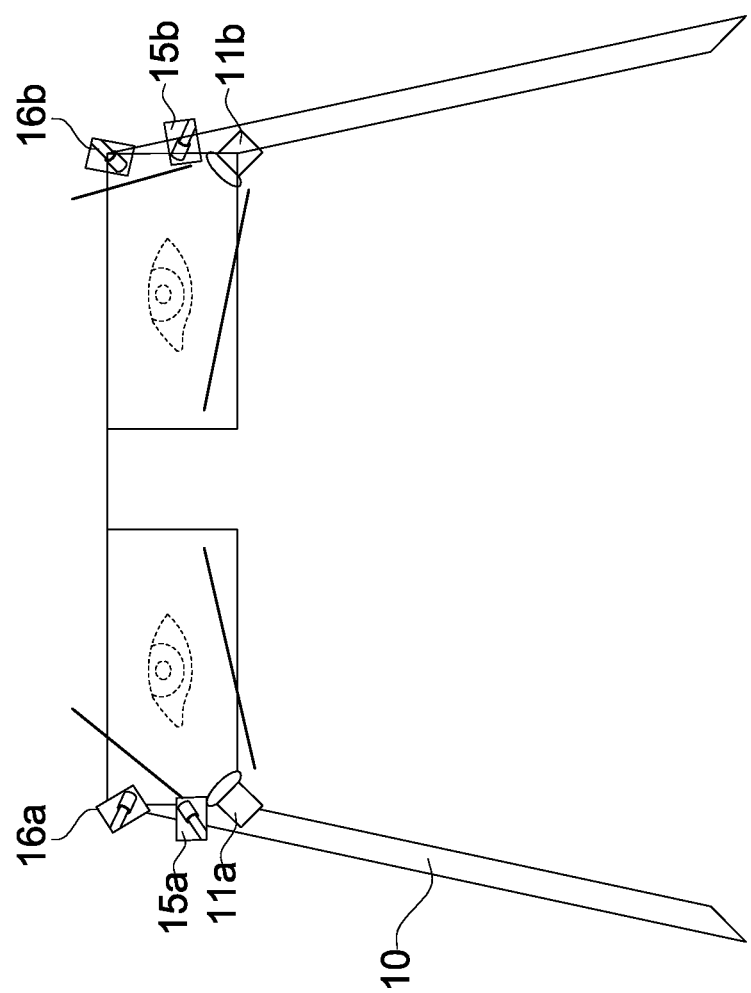
FIG. 14 shows a schematic diagram of the appearance of a second example of the head-mounted display apparatus according to the second embodiment.

Referring to FIGS. 11, 12, and 14, FIG. 14 shows a schematic diagram of the appearance of a second example of the head-mounted display apparatus according to the second embodiment. In FIG. 14, the auxiliary light sources 15a and 15b are white light-emitting diodes and the auxiliary light sources 16a and 16b are infrared light-emitting diodes. The embodiment shown in FIG. 14 differs from that in FIG. 11 in that the image capturing device 11b and the auxiliary light source 15b are disposed in a right lower corner of a lens rim of the eyeglass frame 10, and the auxiliary light source 16b is disposed in a right upper corner of the lens rim of the eyeglass frame 10. The optical axis of the image capturing device 11b is parallel to the optical axis of the auxiliary light source 15b, and the optical axis of the auxiliary light source 15b makes an angle with the optical axis of the auxiliary light source 16b.

The above embodiments of the head-mounted display apparatus and the login method thereof are provided for the sake of explanation. In other embodiments, the head-mounted display apparatus may include two or more infrared light-emitting diodes. In an example, two infrared light-emitting diodes are employed and their optical axes make an angle. In another example, during detection of the current pupil size of the user, a plurality of infrared light-emitting diodes can be turned on at the same time, not limited to only one for the detection. Further, the implementation can employ other type(s) of light-emitting diode(s), such as white light-emitting diode(s), not limited to the infrared light-emitting diode. The above embodiments recognize whether the user is authorized through iris recognition and pupil locus detection so as to avoid others maliciously logging in the head-mounted display apparatus.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A login method for a head-mounted display apparatus in which two lenses are disposed in front of two eyes, the method comprising:
   capturing a first eye image of the eyes by an image capturing device;
   determining whether the first eye image passes an iris recognition test;
   turning off a first auxiliary light source and turning on a second auxiliary light source when the first eye image does not pass the iris recognition test, wherein the second auxiliary light source is different from the first auxiliary light source;
   controlling a pico-projector to project a locus image on the lenses if the first eye image passes the iris recognition test;
   capturing a plurality of second eye images of the eyes moving according to the locus image by the image capturing device;
   generating a pupil locus based on the plurality of second eye images;
   determining whether the pupil locus is compliant with the locus image; and
   allowing a login request if the pupil locus is compliant with the locus image.

2. The method according to claim 1, wherein the locus image includes a start point, a gaze point, and an end point, the gaze point lies between the start point and the end point, and the locus image directs an eye-directed point moving from the start point to the gaze point, staying at the gaze point for a time period, and moving towards the end point.

3. The method according to claim 2, wherein
   the plurality of second eye images include a glare image corresponding to the gaze point;
   when the eye-directed point stays at the gaze point, it is determined whether the glare image passes the iris recognition test; and
   when the glare image passes the iris recognition test, the locus image directs the eye-directed point moving towards the end point.

4. The method according to claim 1, wherein the first auxiliary light source is a white light-emitting diode and the second auxiliary light source is an infrared light-emitting diode.

5. The method according to claim 4, wherein the image capturing device has an optical axis parallel to an optical axis of the second auxiliary light source, and the optical axis of the second auxiliary light source makes an angle with an optical axis of the first auxiliary light source.

6. The method according to claim 4, wherein the image capturing device has an optical axis parallel to an optical axis of the first auxiliary light source, and the optical axis of the first auxiliary light makes an angle with an optical axis of the second auxiliary light source.

7. The method according to claim 1, wherein the first auxiliary light source is an infrared light-emitting diode and the second auxiliary light source is a white light-emitting diode.

8. The method according to claim 7, wherein the image capturing device has an optical axis parallel to an optical axis of the second auxiliary light source, and the optical axis of the second auxiliary light source makes an angle with an optical axis of the first auxiliary light source.

9. The method according to claim 7, wherein the image capturing device has an optical axis parallel to an optical axis of the first auxiliary light source, and the optical axis of the first auxiliary light source makes an angle with an optical axis of the second auxiliary light source.

10. The method according to claim 1, further comprising:
    in a calibration mode, controlling the pico-projector to project a straight line locus image;
    capturing a plurality of third eye images corresponding to the straight line locus image by the image capturing device;
    generating an initial pupil locus based on the plurality of third eye images; and
    performing a calibration based on the initial pupil locus, a position of the image capturing device, and an eye position to generate a plurality of calibration parameters, wherein the plurality of calibration parameters are used for calibrating the pupil locus.

11. A head-mounted display apparatus, comprising:
    two lenses to be disposed in front of two eyes;
    an image capturing device to capture a first eye image of the eyes and a plurality of second eye images of the eyes moving according to a locus image;
    a pico-projector;
    an application specific integrated circuit to determine whether the first eye image passes an iris recognition test;
    a first auxiliary light source;
    a second auxiliary light source, wherein the application specific integrated circuit turns off the first auxiliary light source and turns on the second auxiliary light source when the first eye image does not pass the iris recognition test, wherein the second auxiliary light source is different from the first auxiliary light source; and an application processor to control the pico-projector to project the locus image on the lenses when the first eye image passes the iris recognition test, and to generate a pupil locus based on the plurality of second eye images, wherein the application processor determines whether the pupil locus is compliant with the locus image, and allows a login request if the pupil locus is compliant with the locus image.

12. The apparatus according to claim 11, wherein the locus image includes a start point, a gaze point, and an end point, the gaze point lies between the start point and the end point, and the locus image directs an eye-directed point moving from the start point to the gaze point, staying at the gaze point for a time period, and moving towards the end point.

13. The apparatus according to claim 12, wherein
the plurality of second eye images include a glare image corresponding to the gaze point;
when the eye-directed point stays at the gaze point, a determination is made as to whether the glare image passes the iris recognition test; and
when the glare image passes the iris recognition test, the locus image directs the eye-directed point moving towards the end point.

14. The apparatus according to claim 11, wherein the first auxiliary light source is a white light-emitting diode and the second auxiliary light source is an infrared light-emitting diode.

15. The apparatus according to claim 14, wherein the image capturing device has an optical axis parallel to an optical axis of the second auxiliary light source, and the optical axis of the second auxiliary light source makes an angle with an optical axis of the first auxiliary light source.

16. The apparatus according to claim 14, wherein the image capturing device has an optical axis parallel to an optical axis of the first auxiliary light source, and the optical axis of the first auxiliary light source makes an angle with an optical axis of the second auxiliary light source.

17. The apparatus according to claim 11, wherein the first auxiliary light source is an infrared light-emitting diode and the second auxiliary light source is a white light-emitting diode.

18. The apparatus according to claim 17, wherein the image capturing device has an optical axis parallel to an optical axis of the second auxiliary light source, and the optical axis of the second auxiliary light source makes an angle with an optical axis of the first auxiliary light source.

19. The apparatus according to claim 17, wherein the image capturing device has an optical axis parallel to an optical axis of the first auxiliary light source, and the optical axis of the first auxiliary light source makes an angle with an optical axis of the second auxiliary light source.

20. The apparatus according to claim 11, wherein
the application processor, in a calibration mode, controls the pico-projector to project a straight line locus image;
the image capturing device captures a plurality of third eye images corresponding to the straight line locus image; and
the application specific integrated circuit generates an initial pupil locus based on the plurality of third eye images, and performs a calibration to generate a plurality of calibration parameters, based on the initial pupil locus, a position of the image capturing device, and an eye position, wherein the plurality of calibration parameters are used for calibrating the pupil locus.

* * * * *